US011539615B2

(12) United States Patent
Murakami et al.

(10) Patent No.: US 11,539,615 B2
(45) Date of Patent: Dec. 27, 2022

(54) DISAGGREGATED BORDER GATEWAY PROTOCOL (BGP)

(71) Applicant: Arrcus Inc., San Jose, CA (US)

(72) Inventors: Tetsuya Murakami, Sunnyvale, CA (US); Kalyani Rajaraman, San Jose, CA (US); Keyur Patel, San Jose, CA (US)

(73) Assignee: ARRCUS INC., San Jose, CA (US)

( * ) Notice: Subject to any disclaimer, the term of this patent is extended or adjusted under 35 U.S.C. 154(b) by 40 days.

(21) Appl. No.: 17/078,827

(22) Filed: Oct. 23, 2020

(65) Prior Publication Data

US 2022/0131784 A1      Apr. 28, 2022

(51) Int. Cl.
| | |
|---|---|
| *H04L 45/02* | (2022.01) |
| *H04L 45/28* | (2022.01) |
| *H04L 12/46* | (2006.01) |
| *H04L 45/00* | (2022.01) |
| *H04L 45/586* | (2022.01) |

(52) U.S. Cl.
CPC .......... *H04L 45/04* (2013.01); *H04L 12/4633* (2013.01); *H04L 45/20* (2013.01); *H04L 45/22* (2013.01); *H04L 45/28* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 10,250,552 B1* | 4/2019 | Sajassi | H04L 69/325 |
| 2006/0156402 A1 | 7/2006 | Stone et al. | |
| 2006/0198298 A1* | 9/2006 | Bhogavilli | H04L 45/00 |
| | | | 370/216 |

\* cited by examiner

*Primary Examiner* — Christine T Duong
(74) *Attorney, Agent, or Firm* — David R. Stevens; Stevens Law Group

(57) ABSTRACT

Disaggregated border gateway protocol (BGP) enables an eBGP session between an internal node an external node to continue despite failover of a perimeter through which the eBGP session is established. eBGP control traffic is trapped by a perimeter router and forwarded to a BGP speaker on the internal node through an IP tunnel. Failover is detected in response to a change in a source address of the IP tunnel over which eBGP control traffic is received. The BGP speaker announces routes to the external node that include a reference to an internal address of an active perimeter router. In response to failover, the BGP speaker announces updated routes referencing the standby router for the perimeter router.

20 Claims, 8 Drawing Sheets

DISAGGREGATED BORDER GATEWAY PROTOCOL (BGP)

BACKGROUND

Border Gateway Protocol (BGP) provides a standardized means for a gateway facing an exterior network to exchange routing information with computer systems on a network, particularly the Internet. Routing information may be shared in the form of path-vectors. Routing decisions may be made based on paths, network policies, or rule sets specified by an administrator. BGP used for routing within a network is called Interior BGP (iBGP). BGP used for sharing routing information with an external is called External BGP (eBGP).

It would be an advancement in the art to improve the implementation of BGP in a network environment.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
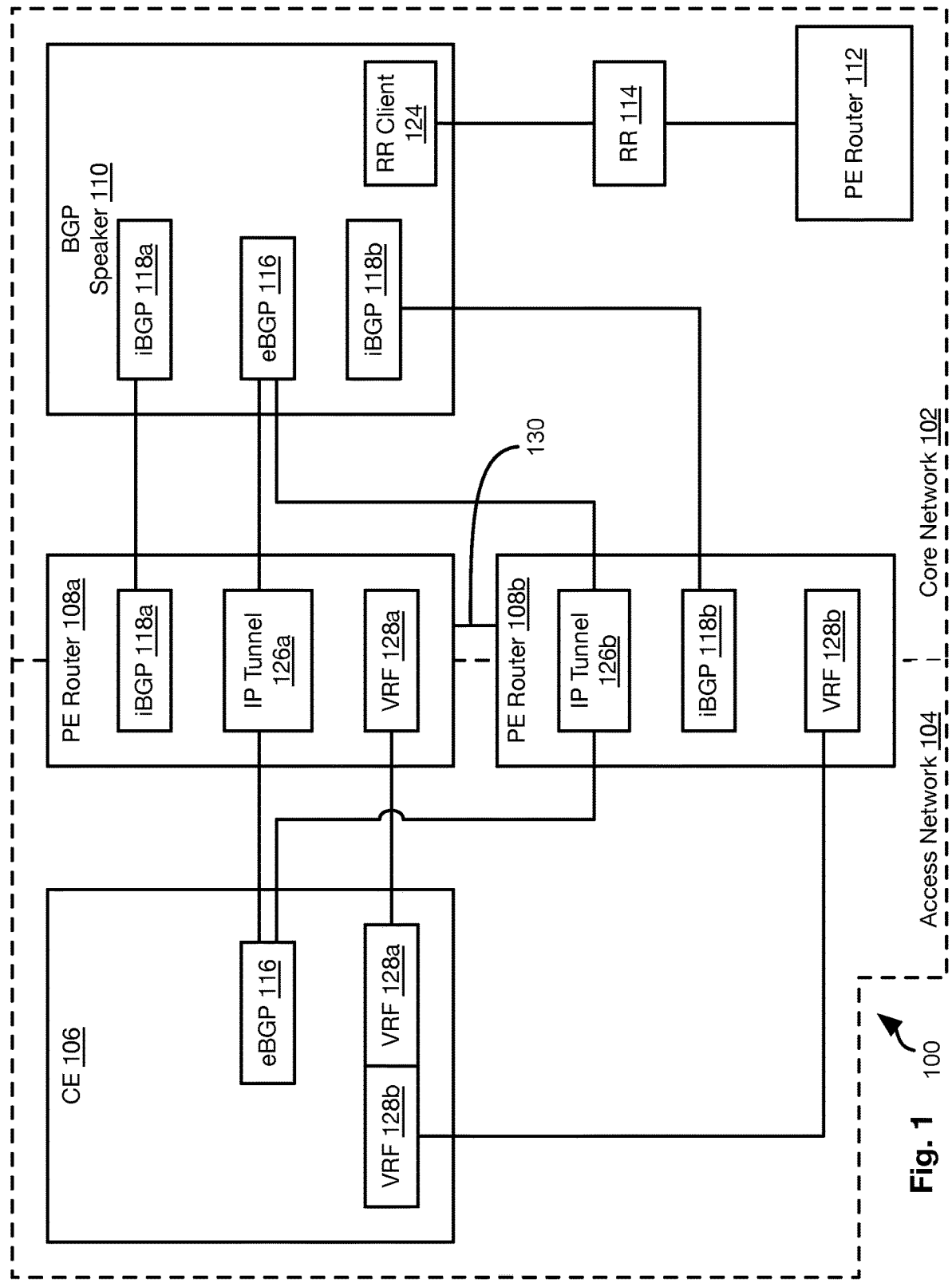
FIG. 1 is schematic block diagram of a network environment for implementing disaggregated BGP in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1, illustrates an example of an network environment 100 in which the systems and methods described herein may be implemented. The network environment 100 may include a core network 102 and an access network 104. The core network 102 and access network 104 may include any networking and computing devices known in the art, such as switches, routers, servers, user workstations, user mobile devices, and the like. The core network 102 may be a network that is internal to an entity, such as an entity providing network access, an entity services to users over the Internet. The access network 104 is external to the core network 102 and may be controlled by a different entity or group of entities. In an example implementation, the access network 104 is the Internet.

A client endpoint (CE) 106 may connect to the access network and communicate with one or more devices within the core network 102. A boundary between the core network 102 and the access network 104 may be defined by one or more perimeter provider edge (PE) routers 108a, 108b (hereinafter simply PE routers 108a, 108b). In particular, access to the core network 102 by a device, such as CE 106, in the access network 104 may be performed only through perimeter routers that include the PE routers 108a, 108b.

In a conventional implementation, perimeter PE routers provide a redundant access to the core network 102 such that on failure of one perimeter PE router, traffic is routed to another perimeter PE router. In a conventional implementation, the perimeter PE routers implement border gateway protocol (BGP) with respect to client devices accessing the core network from the access network. Accordingly, an eBGP session between a client device must be reestablished between the client and the other perimeter PE router when failover occurs. Although this is performed quickly, it does result in interruption of traffic that is a discernible degradation of service provided using the core network 102 and may result in failure to meet quality of service (QoS) requirements and Service Level Agreements (SLA) agreed to by the entity providing the core network 102.

In the illustrated embodiment, the implementation of BGP is disaggregated from the PE routers 108a, 108b. A BGP speaker 110 is hosted on a computer system within the core network 102 and does not execute on the PE routers 108a, 108b. Stated differently, for a group of PE routers 108a, 108b providing redundant access (one PE router assuming routing function of another in the group) to the core network 102 from an external access network 104, BGP control and maintenance of BGP session state information for traffic routed through the PE routers 108a, 108b of that group is not implemented on any of the PE routers 108a, 108b of that group and an executable that manages BGP session state information and generates and responds to BGP control traffic is also not executing on any of the PE routers 108a, 108b of that group.

The computer system executing the BGP speaker 110 may be a general purpose computer and need not be a switch, router, or other item of networking specific equipment or be configured as a network server, however any of these options may be used in some implementations. For example, the computer system executing the BGP speaker may be as simple as a desktop computer, such as a personal computer (PC) running WINDOWS or LINUX operating system, an APPLE MACINTOSH computer running MACOS, or other type of computer system.

The core network 100 may include one or more internal routing components, such as an internal PE router 112 and an internal BGP route reflector (RR) 114. The RR 114 may rebroadcast, such as without modification, routes received from one or more internal PE routers 112, the BGP speaker 110, or other component. The internal router 112 may also be an RR client of RR 114 and receive routes rebroadcast by the RR 114. There may be any number of internal PE routers 112 and route reflectors RR. Likewise, there may be any number of internal computing devices, such as internal routers 112 or other networking components, interposed between the BGP speaker 110 and the PE routers 108a, 108b.

To facilitate understanding of the systems and methods described herein, the components 106, 108a, 108b, may implement some or all of following networking sessions:

BGP speaker 110 and CE 106 implement an eBGP session 116.

BGP speaker 110 and PE router 108a implement an iBGP session 118a with the BGP speaker 110 functioning as a route reflector (RR) within the iBGP session 118a and the PE router 108a being a RR client of the BGP speaker 110.

BGP speaker 110 and PE router 108b implement an iBGP session 118b with the BGP speaker 110 functioning as a route reflector (RR) within the iBGP session 118b and the PE router 108b being a RR client of the BGP speaker 110.

BGP speaker 110 implements an RR client 124 of RR 114.

BGP speaker and CE 106 exchange eBGP control packets by way of the PE router 108a over an IP (internet protocol) tunnel 126a implemented by PE 108a when PE 108a is active.

When PE 108b is active, the BGP speaker and CE 106 exchange eBGP control packets by way of PE router 108b over an IP tunnel 126b implemented by PE router 108b.

CE 106 and PE router 108a communicate over a virtual routing and forwarding (VRF) interface 128a.

CE 106 and PE router 108a communicate over a VRF interface 128b.

PE router 108a and PE router 108b implement a redundancy protocol with respect to one another, such as a virtual router redundancy protocol (VRRP) session 130.

Addresses of components of the networking environment 100 as used in the following description are outlined in Table 1, with the listed addresses being labels for use in explaining the systems and methods disclosed herein that would be replaced with real routable IP addresses in an actual implementation. For example, internal addresses could be in one domain (e.g., 10.0.0.x) and external addresses in a different domain (10.1.1.x). Each address may additionally include a port number associated with that address for use in communicating routing information and payload data packets according to the systems and methods described herein.

TABLE 1

Addresses of Components

| Component | Internal Address | External Address |
|---|---|---|
| CE 106 |  | A1 |
| PE router 108a | B1 | C1 |
| PE router 108b | B2 | C1 |
| BGP Speaker 110 | B3 | C1 |
| PE router 112 | B4 | C2 |
| RR 114 | B5 |  |

FIGS. 2 through 7 illustrate various scenarios encountered when implementing BGP using the disaggregated BGP speaker 110 and how these scenarios may be handled in order to ensure proper implementation of BGP.

Figure 2:
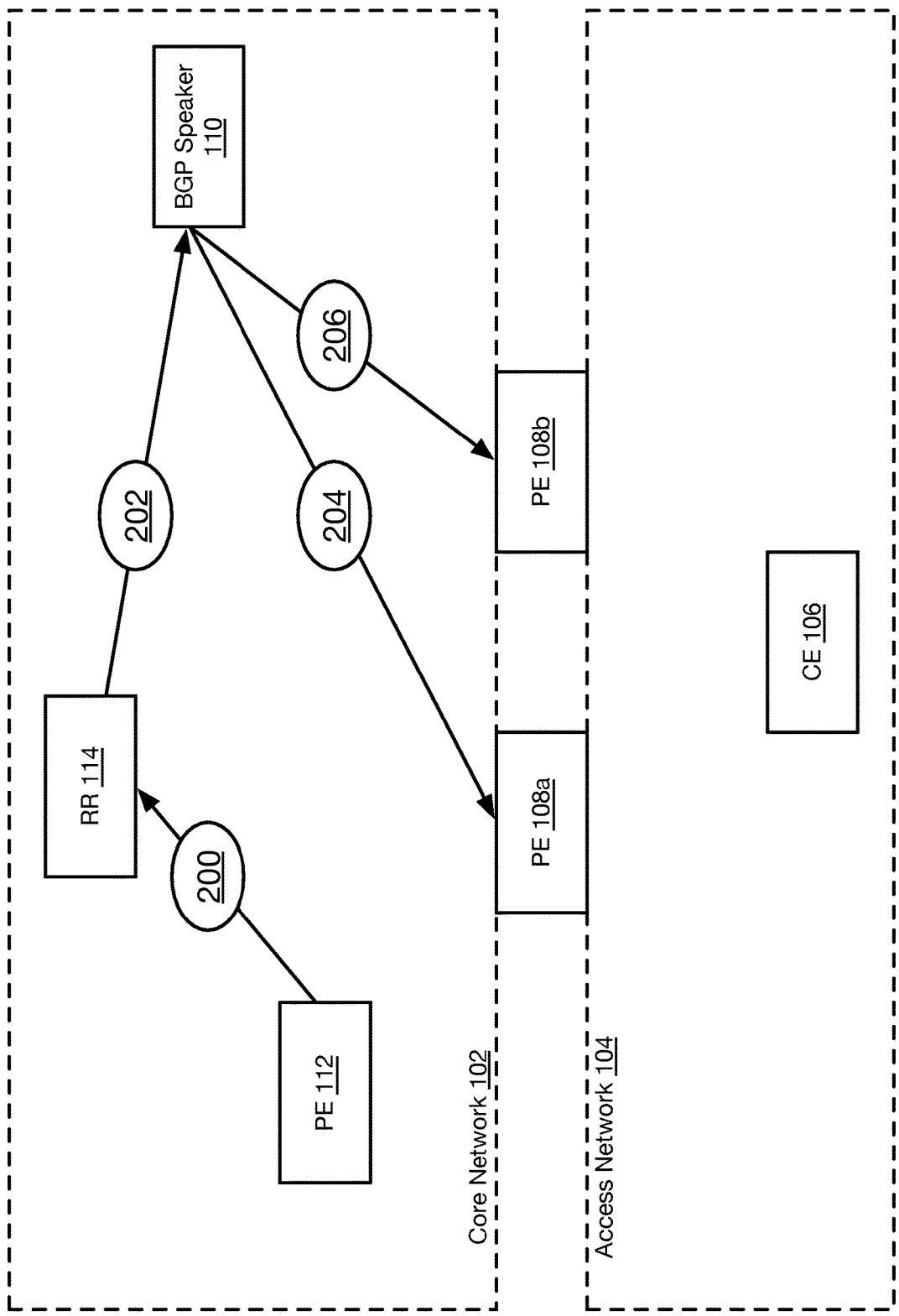
FIG. 2 is a schematic block diagram illustrating reflection of internally generated routes by a disaggregated BGP speaker in accordance with an embodiment of the present invention.

FIG. 2 illustrates a scenario in which an external address (e.g., C2) originated by an internal node, such as from PE router 112, is distributed to a perimeter PE router 108a, 108b using the BGP speaker 110 as a route reflector. As shown in FIG. 2, within the core network 102, the BGP speaker 110 establishes iBGP sessions 118a, 118b with each PE router 108a, 108b. The BGP speaker 110 may also establish an iBGP session with the RR 114 in the core network 102 in order to function as an RR client 124 of RR 114. As noted above, one or more other PE routers 112 may also be a route reflector client of RR 114. As also noted above, each PE router 108a, 108b may be a route reflector client of the BGP speaker 110.

Within the core network 102, the PE router 112 may announce 200 a route defining routing of packets addressed to the PE router 112, such as using the external address (C2) of the PE router 112 as the nexthop in the announced route. The BGP speaker 110 may receive this route either directly or by receiving the route when it is announced 202 by one or more route reflectors, such as the RR 114. The BGP speaker 110, operating as a route reflector, may then distribute 204, 206 VPN routes originated by PE router 112 (directly or by way of one or more RRs, such as RR 114) to the PE router 108a, 108b operating as RR clients of the BGP speaker 110. Routes may be distributed from BGP speaker to the PE routers 108a, 108b using within the iBGP sessions 118a, 118b. The VPN routes originated by other PE nodes 112 (other than PE routers 108a, 108b) can be distributed 204, 206 to the PE routers 108a, 108b through the BGP speaker 110 without modification.

In this and other scenarios discussed with respect to FIGS. 2 through 7, the flow of route information that is announced and distributed is shown. Traffic transmitted according to the route information announced and distributed will follow a path in the reverse direction. For example, traffic transmitted route according to information distributed to PE router 108a that was originated by PE router 112 will be routed from PE router 108a to the external address (C2) of PE router 112. Since RR 114 and BGP speaker 110 are each operating only as reflectors (i.e., do not modify routes that are reflected), the route received by PE router 108a, 108b may point directly to PE router 112. Accordingly, traffic transmitted according to the distributed route may be transmitted directly to PE router 112 within the core network 102 in bypass of the BGP speaker 110.

Figure 3:
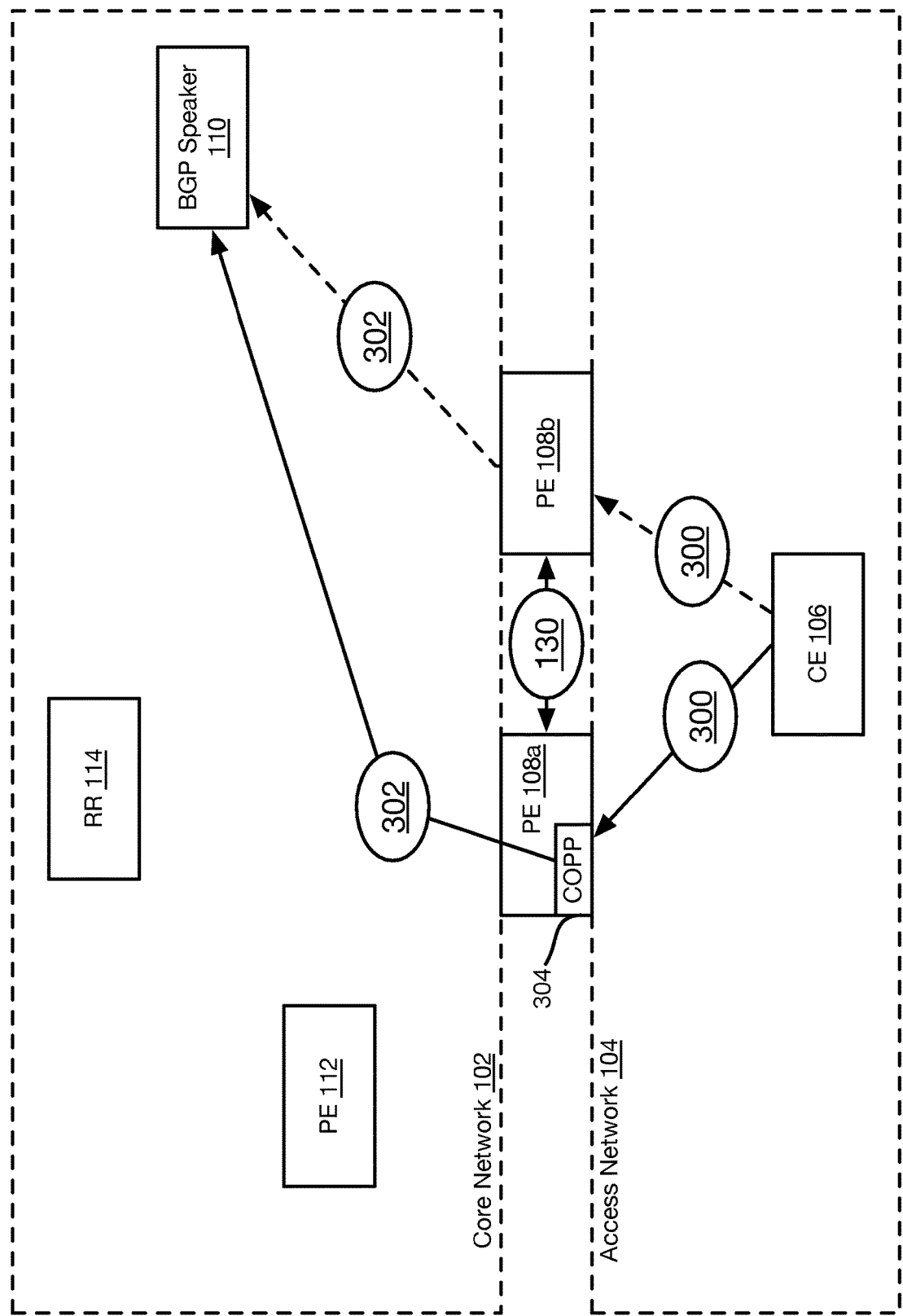
FIG. 3 is a schematic block diagram illustrating routing of BGP traffic from an external client to the disaggregated BGP speaker in accordance with an embodiment of the present invention.

Referring to FIG. 3, the CE 106 may have an eBGP session 116 with the BGP speaker 110 and may therefore transmit 300 BGP control packets to the BGP speaker 110 by way of the PE router 108a. As shown in Table 1, the BGP speaker 110, PE router 108a, and PE router 108b may have the same external IP address C1 such that packets transmitted by the CE 106 to the BGP speaker 110 will be received by the PE routers 108a, 108b. The PE routers 108a, 108b may capture these BGP control packets and forward 302 the BGP control packets to the BGP speaker 110. For example, whichever of the PE routers 108a, 108b is active will forward 302 the BGP control packets to the BGP speaker 110.

The PE routers 108a, 108b may implement Control Plane Policing (COPP) 304. The COPP 304 may be programmed to intercept BGP control packets from the access network 104 (e.g., CE 106). Implementing COPP 304 may include programming the COPP 304 to trap packets addressed to the TCP port number used by BGP (e.g., port 179 according to Internet Assigned Numbers Authority (IANA)). Whichever of PE router 108a and PE router 108b is active will then forward 302 these BGP control packets to the BGP speaker over the IP tunnel 126a of the active PE router 108a so that the CE 106 is not aware of any intermediate hops and the eBGP session between CE and the BGP speaker can be established through PE router 108a or through PE router 108b. The BGP speaker 110 is assigned the same external IP address (C1) as PE routers 108a, 108b and can therefore send and receive traffic addressed to this IP address transparently from the point of view of the CE 106.

Virtual Router Redundancy Protocol (VRRP) 130 may be implemented by PE routers 108a, 108b such that they have the same external address (C1). A connection to the BGP speaker 110 through PE router 108a or PE router 108b is maintained such that CE 106 does not need to restart an eBGP session with the BGP speaker when failover occurs. In the event of failure, the PE router 108b will begin processing packets addressed to the shared external address (C1), including forwarding 302 BGP control packets to BGP speaker 110 over the IP tunnel 126b as described above with respect to PE router 108a.

Figure 4:
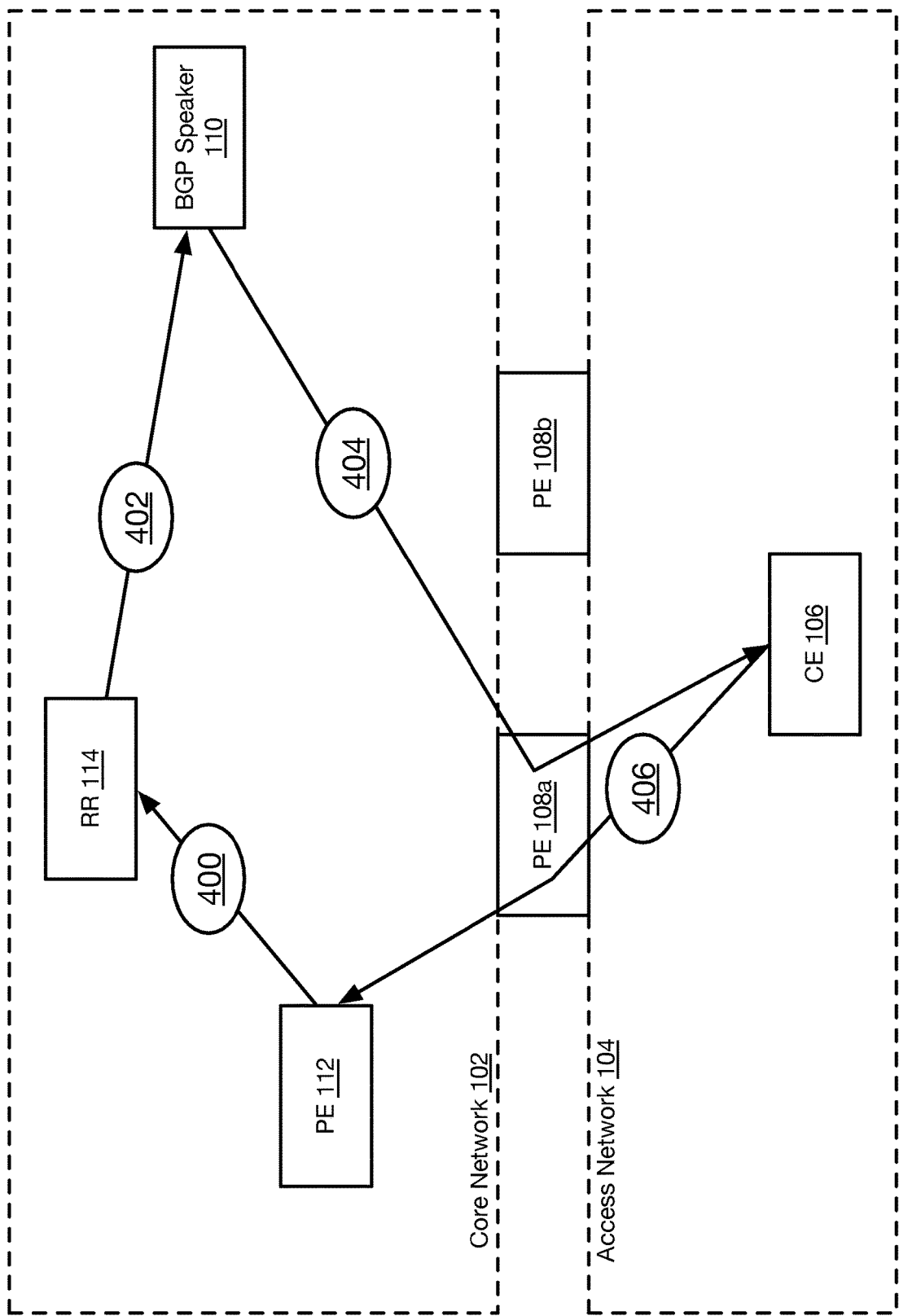
FIG. 4 is a schematic block diagram illustrating reflection of internal routes to external clients by the disaggregated BGP speaker in accordance with an embodiment of the present invention.

Referring to FIG. 4, when announcing VPN routes from internal PE routers (e.g., PE router 112) to the CE 106, the BGP speaker 110 may use its external address (C1, which is the same external address of PE A and PE B in the illustrated example) as the nexthop because an eBGP session between BGP speaker 110 and CE 106 is established between C1 and the A1 (the external address of the CE 106). Also, the shared address (C1) may be assigned to the VRF interfaces 128a, 128b on PE routers 108a, 108b.

In the illustrated example, PE router 112 announces 400 a route ("the original route"), such as a route including its the external address (C2) as nexthop. The original route may be received by the RR 114 and distributed 402 to the BGP speaker 110 as an RR client of the RR 114. The BGP speaker 110, acting as a BGP speaker as opposed to a route reflector, may add its own external address (C1) as the nexthop to the original route to obtain an augmented route. This augmented route may be transmitted 404 to the CE 106, such as over the IP tunnel 126a used for BGP control traffic as described above. The BGP speaker 110, or other route reflector 114, may also distribute the original route to the PE routers 108a, 108b without modification, i.e. the nexthop will remain the external address (C2) of the PE router 112.

In response to receiving the augmented route, the CE 106 may transmit 406 traffic addressed to PE router 112 (e.g., an endpoint reachable through the PE router 11) to the PE routers 108a, 108b since they have the same external address (C1) as the BGP speaker 110 recorded as the nexthop in the augmented route. The active PE router 108a may receive this traffic over the VRF interface 128 that is assigned the shared external address C1. Since this traffic is not BGP control traffic, it is not trapped using COPP and forwarded to the BGP speaker 110 as described above with respect to FIG. 3. Instead, the active PE router forwards 406 this traffic to the address of the PE router 114 (e.g., external address C2 assigned to PE router 114) referenced as the nexthop in the original route. Since RR 114 is operating as a reflector, RR 114 is not added to the route received from PE router 112 and distributed at step 402. RR 114 may therefore be bypassed by the forwarded traffic at step 406.

Figure 5:
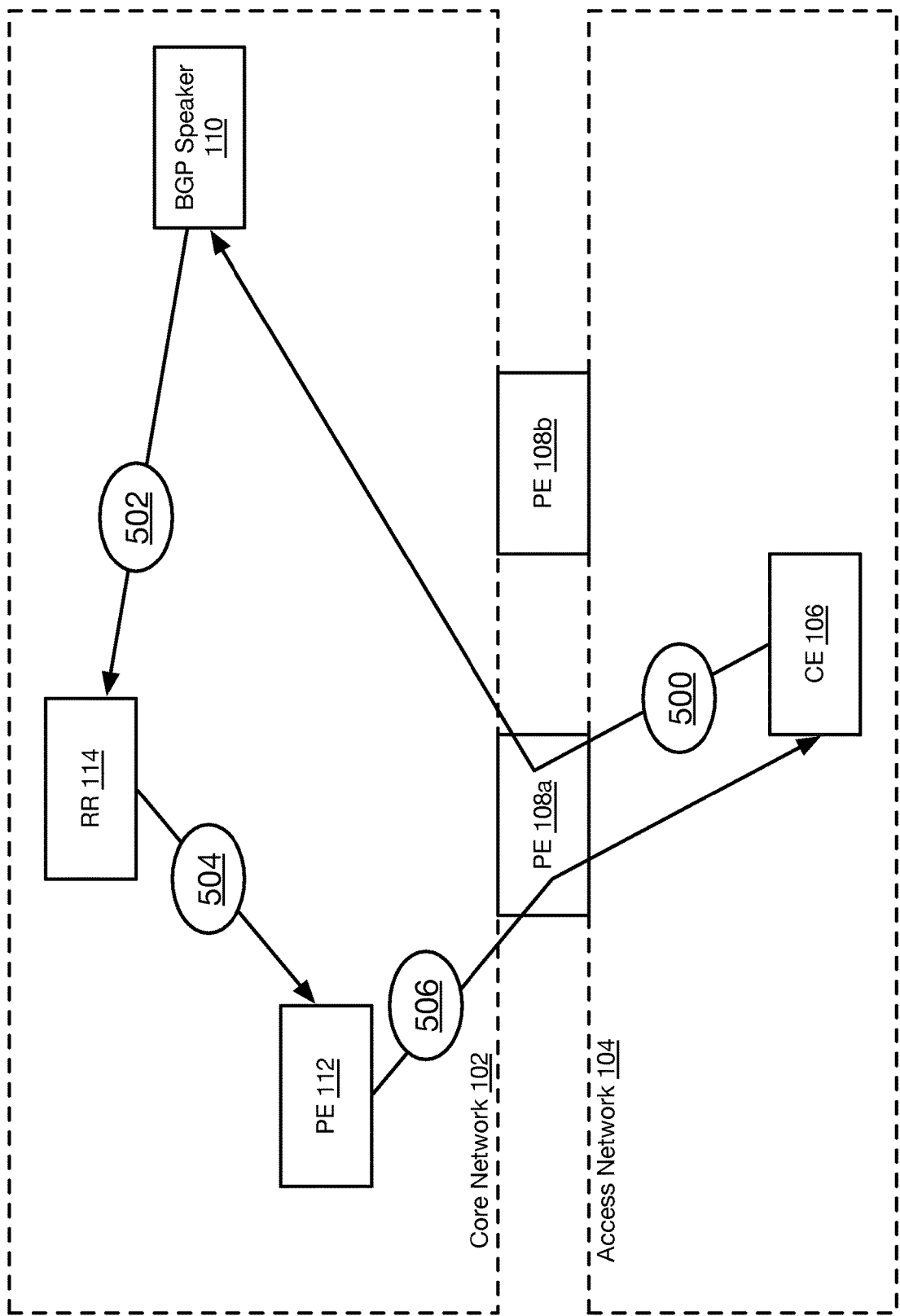
FIG. 5 is a schematic block diagram illustrating translation of routes from an external client by the disaggregated BGP speaker in accordance with an embodiment of the present invention.

Referring to FIG. 5, routes, such as VPN routes, may be generated by CE 106 that define a route between CE 106 and an internal node (e.g., PE router 112). These routes may be transmitted 500 to the BGP speaker 110 by way of the active PE router 108a (e.g., trapped by PE router 108a and transmitted over the IP tunnel 126a to the BGP speaker 110).

In response to such routes, the BGP speaker 110 may obtain a source address of the active IP tunnel 126a over which the route was received. In this case, the source address may be the internal address (B1) of PE router 108a. The BGP speaker 110 may replace references to the BGP speaker's internal address (B3) in such routes with the source address of the active tunnel as the nexthop (internal address B1 of PE router 108a in the illustrated example) to obtain a modified route and distribute 502 the modified route to one or more internal nodes (e.g., RR 114 which then distributes 504 the route to PE router 112). Alternatively, the BGP speaker 110 adds the source address of the active tunnel to the route as the nexthop to obtain the modified route rather than using its own internal address. In either case, the modified route may include the internal address of the PE router 108a (B1) as the nexthop.

The BGP speaker 110 may announce 502 the modified route to one or more internal nodes, such as to the RR 114 which distributes 504 the modified route to the PE 112. Accordingly, traffic transmitted 506 by PE router 112 and addressed to CE 106 may be routed by way of the active PE router 108a, which is the nexthop in the modified route.

Figure 6:
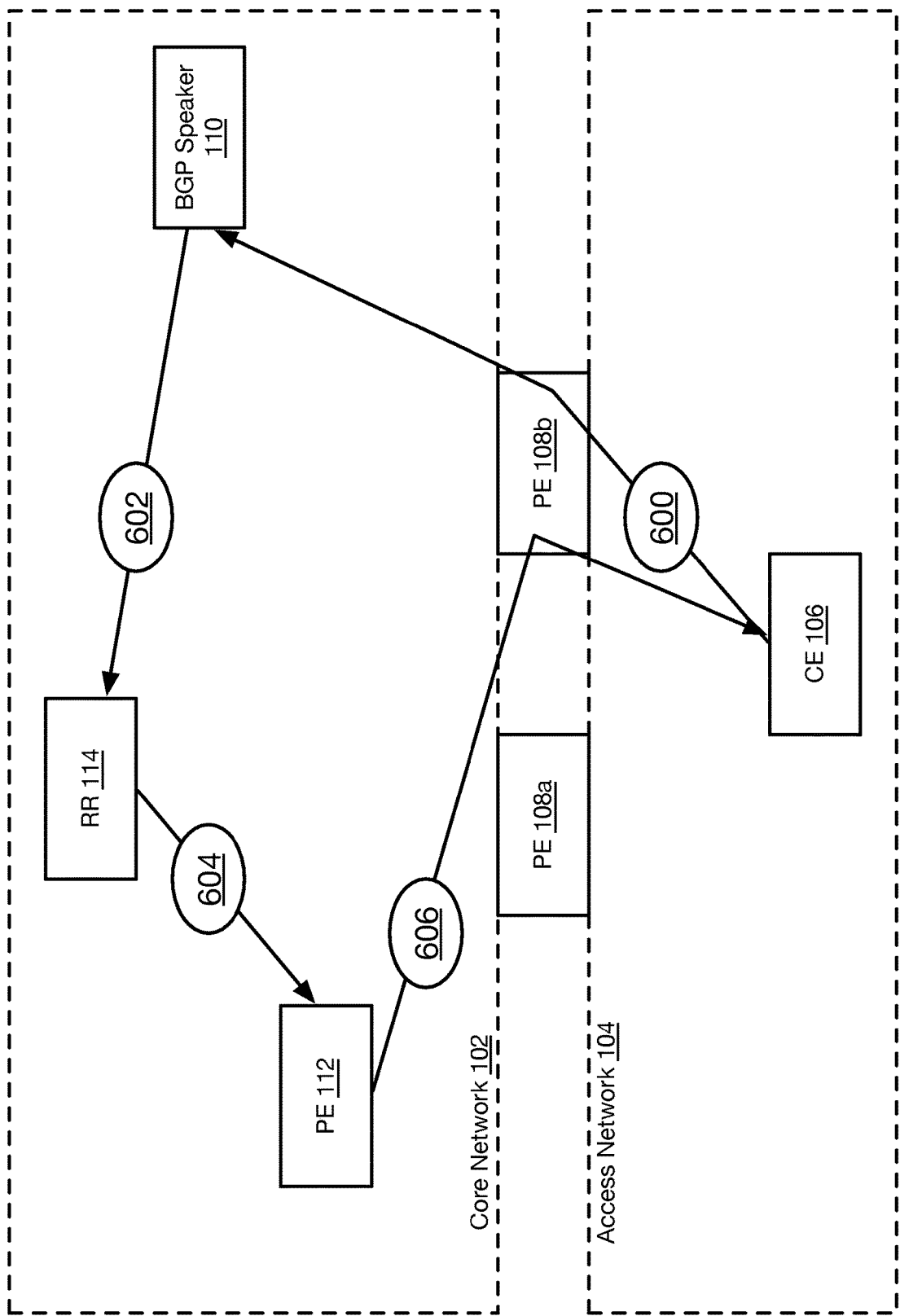
FIG. 6 is a schematic block diagram illustrating the handling, by the BGP speaker, failover between perimeter routers in accordance with an embodiment of the present invention.

FIG. 6 illustrates actions performed in response to a failover from the active PE router 108a to the standby PE router 108b. As described above, BGP control packets transmitted 600 from CE 106 may be trapped and routed to the BGP speaker 110 over the IP tunnel 126a or 126b, such as by implementing COPP on the PE routers 108a, 108b. The BGP speaker 110 may therefore inspect the source IP address of the IP tunnel 126a or 126b over which the BGP control packet was received. The BGP speaker may detect when the source address of a BGP control packet is found to be different from that of a previously received BGP control packet. For example, a first packet may be received over IP tunnel 126a from source address B1 and a subsequent second packet received over IP tunnel 126b from source address B2 thereby indicating occurrence of a VRRP failover from PE router 108a to PE router 108b.

In response to detecting failover, the BGP speaker 110 may announce new routes to CE 106 to replace routes that were previously announced. In particular, modified routes to CE 106 may have been previously announced according to the approach of FIG. 5 and that referenced PE router 108a as the nexthop. Accordingly, updated routes may be generated by the BGP speaker 110 and announced 602 to one or more internal nodes, the updated routes replacing references to the internal address of the PE router 108a (B1) with the internal address of the PE router 108b (B2) as the nexthop. These updated routes may be received by RR 114, which then distributes 604 the updated routes to one or more other internal nodes, such as PE router 112.

Accordingly, traffic addressed to CE 106 processed by PE router 112 may be transmitted 606 to PE router 108b, which forwards the traffic to CE 106 over the VRF connection 128b between CE 106 and PE router 108b.

Note that through the failover process that the eBGP session between BGP speaker 110 and CE 106 is not interrupted. The routing of BGP control packets transitioned from PE router 108a, 108b transparently to CE 106, which continues to send and receive BGP control packet to the same external address (C1) that is shared by the VRF interfaces 128 of both PE routers 108a, 108b. Since the BGP state information and the executable performing BGP management resided on a different node than the failed PE router 108a, the eBGP session was not interrupted and there is no perceptible interruption to the CE 106 other than possibly a few dropped packets before PE router 108b took up routing previously performed by PE router 108a.

While the standby PE router 108b is active after failover it may perform any and all of the functions ascribed herein to the active PE router 108a. When the PE router 108a is replaced, restarted, or otherwise becomes functional, the PE router 108a may once again become active and the PE router 108b may again become the standby router. This transition may be detected by the BGP speaker 110 based on a change in the source address of the IP tunnel over which BGP control traffic was received as described above. This transition may be handled by announcing updated routes referencing the PE router 108a in the same manner as described above.

Figure 7:
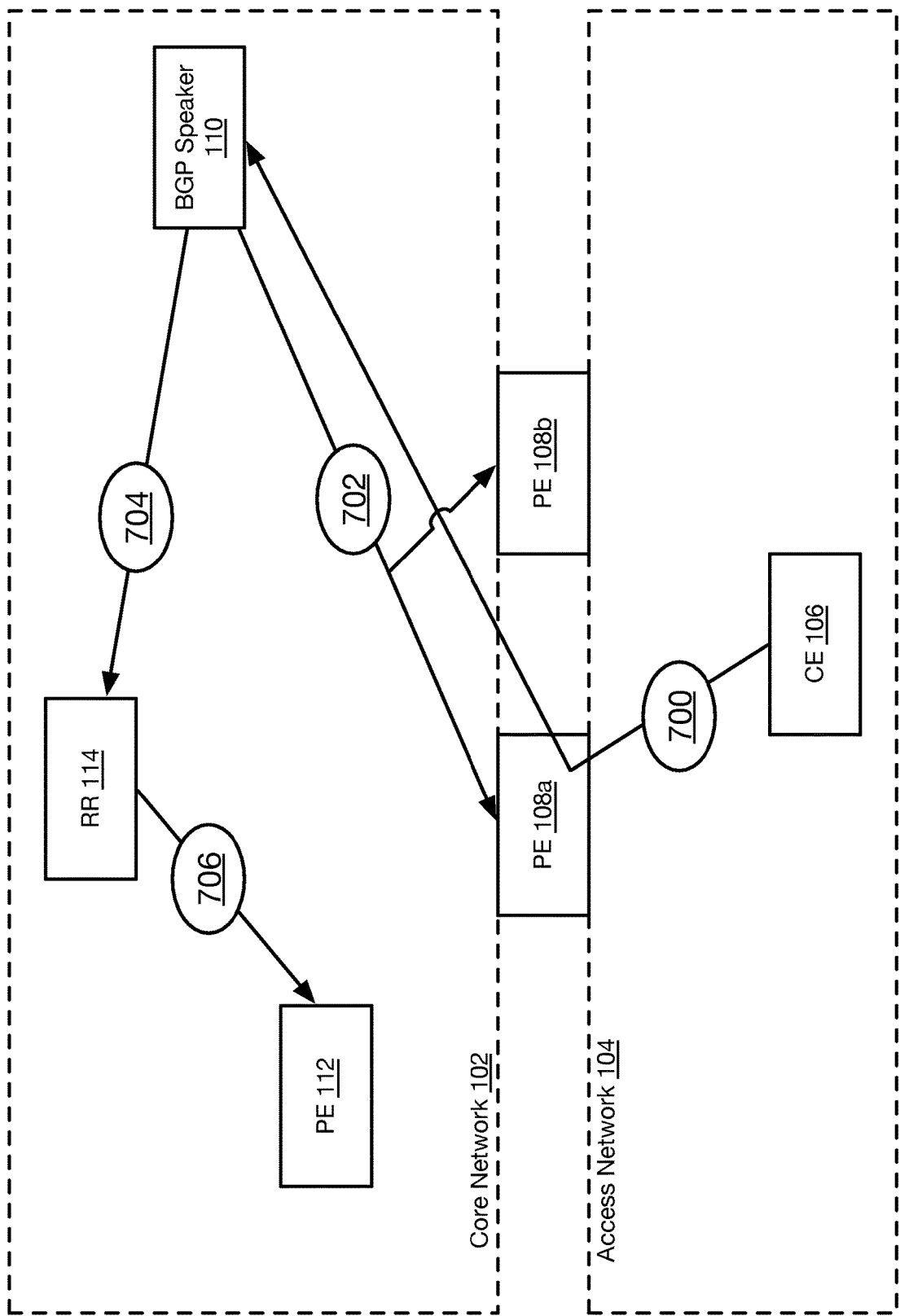
FIG. 7 is a schematic block diagram illustrating distribution of routes received from an external client to the perimeter routers by the disaggregated BGP speaker in accordance with an embodiment of the present invention.

FIG. 7 illustrates a scenario in which CE 106 announces 700 a route to the BGP speaker 110, such as through BGP control packets forwarded to the BGP speaker 110 by whichever of the PE routers 108a, 108b is active as described above. FIG. 7 illustrates how the BGP speaker 110 modifies and distributes the route to internal nodes, such as PE 112 and RR 114, in contrast to perimeter nodes, such as PE router 108a and PE router 108b.

The route as received from CE 106 may include the external address of the CE 106 (A1) as the nexthop. In a conventional approach, the BGP speaker 110 would add its own internal address (B3) as nexthop to obtain an updated route and transmit the updated route to one or more internal nodes.

In the illustrated approach, the BGP speaker 110 announces 702 a first updated route to PE routers 108a and 108b, the first updated route being the route received from step 700 with the nexthop being preserved as the external address (A1) of the CE 106. The first updated route may additionally or alternative include a VRF identifier (route distinguisher) indicating the VRF table referencing the CE 106 that should be used. The PE router 108a is therefore instructed to use the VRF interface 128a of the active PE router 108a to transmit packets to the CE 106.

In contrast, the BGP speaker 110 may announce 704 a second updated route to nodes of the core network 102 other than the PE routers 108a, 108b. The second updated route may include the route received from step 700 with the addition of a nexthop that is the internal address of whichever of the PE routers 108a, 108b is active (the internal address (B1) of PE router 108a in the illustrated example). In the illustrated embodiment, the second updated route is received by RR 114 and distributed 706 by RR 114 to the PE router 112.

Traffic addressed to CE 106 by PE router 112 will be transmitted to the internal address (A1) of the active PE router 108a according to the second updated route. Traffic addressed to CE 106 received by the active PE router 108a will be transmitted directly to the external address (A1) the CE 106 over the VRF interface 128*a* according to the first updated route.

Figure 8:
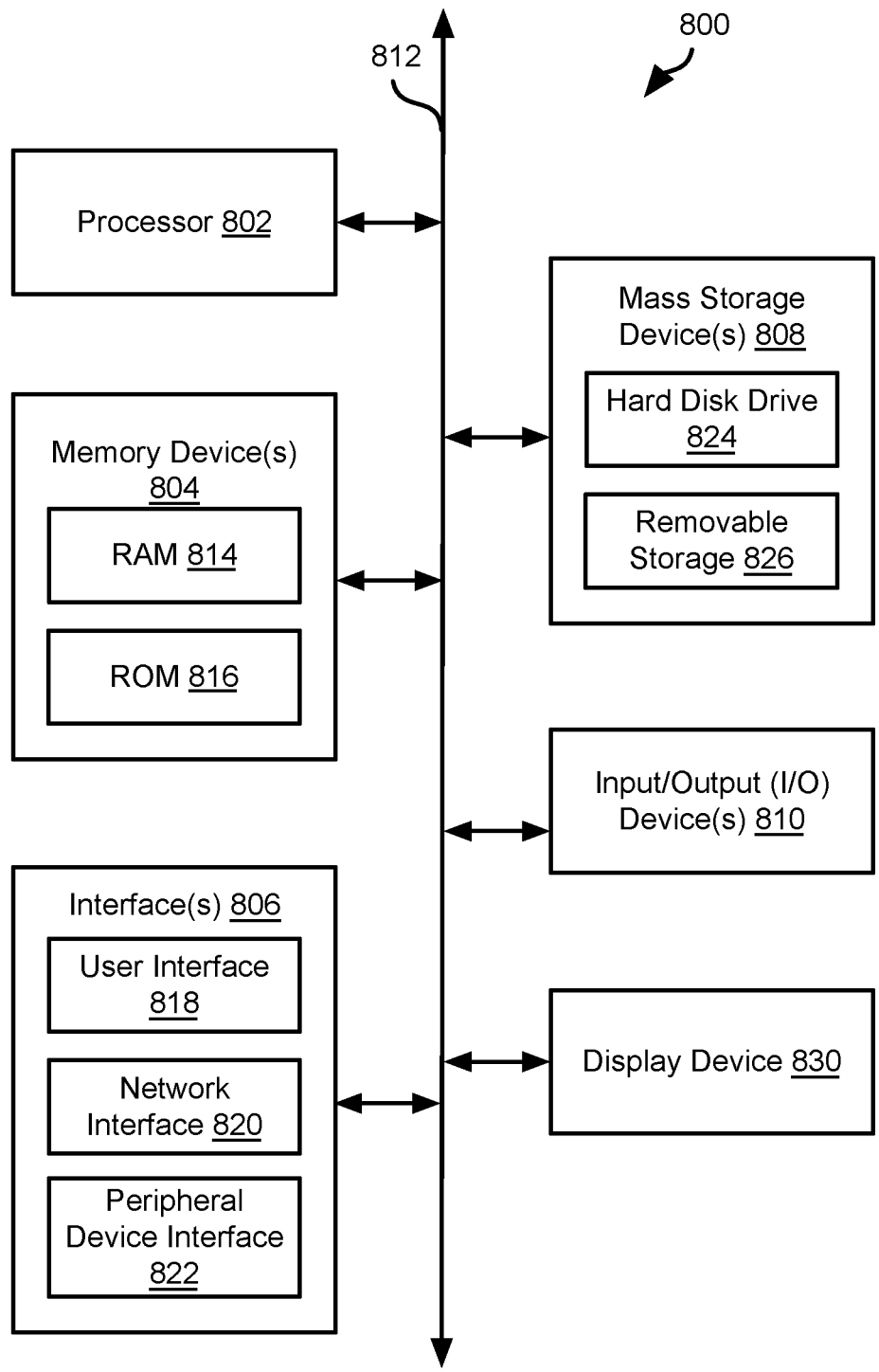
FIG. 8 is a schematic block diagram of a computer system suitable for implementing methods in accordance with embodiments of the present invention.

FIG. 8 is a block diagram illustrating an example computing device 800 which can be used to implement the system and methods disclosed herein. Nodes implementing the PE routers 108*a*, 108*b*, 112, BGP speaker 110, CE 106, and RR 114 according to any of the embodiments described above may have some or all of the attributes of a computing device 800. Likewise, a cloud computing platform maybe composed of devices having some or all of the attributes of the computing device 809.

Computing device 800 may be used to perform various procedures, such as those discussed herein. Computing device 800 can function as a server, a client, or any other computing entity. Computing device can perform various monitoring functions as discussed herein, and can execute one or more application programs, such as the application programs described herein. computer, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, etc.), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
providing a first perimeter router at a boundary between an internal network and an external network;
providing an internal node executing within the internal network and connected to the first perimeter router by the internal network;
executing, by the internal node, a protocol executable implementing a network protocol;
establishing, by the internal node, a protocol session with an external node with the protocol executable;
routing, by the first perimeter router, control traffic of the protocol session addressed to a first address assigned to the internal node to the internal node over a tunnel; and
routing, by the first perimeter router, traffic addressed to the first address that is not control traffic of the protocol session in bypass of the internal node.

2. The method of claim 1, further comprising:
performing failover from the first perimeter router to a second perimeter router while continuing the protocol session between the internal node and the external node through the second perimeter router without establishing a new protocol session.

3. The method of claim 2, wherein the first perimeter router, second perimeter router, and internal node are all assigned the first address.

4. The method of claim 3, wherein the first address is an external address defined in a domain of the external network.

5. The method of claim 4, wherein the first perimeter router is active and the second perimeter router is a standby router for the first perimeter router.

6. The method of claim 5, wherein the first perimeter router and the second perimeter router implement virtual redundant router protocol (VRRP).

7. The method of claim 2, wherein the network protocol is border gateway protocol (BGP) and the internal node is not at a boundary between the internal network and the external network.

8. The method of claim 7, wherein the protocol session is an external BGP (eBGP) session.

9. The method of claim 7, wherein the internal node implements a first internal BGP (iBGP) session with the first perimeter router and a second iBGP session with the second perimeter router.

10. The method of claim 3, wherein the internal node is a first internal node, the method further comprising:

receiving, by the first internal node, a first route announced by a second internal node, the first route defining a route to the second internal node;

distributing, by the first internal node, the first route without modification;

receiving, by the first internal node, a second route announced by a second internal node, the first route defining a route from the external node to the second internal node; and distributing, by the first internal node, a modified version of the second route, the modified version adding the first address as a nexthop of the modified version of the second route.

11. The method of claim 10, further comprising:

receiving, by the first internal node, a third route announced by the external node, the first route defining a route from the second internal node to the external node; and distributing, by the first internal node, a first modified version of the third route, the first modified version of the third route adding a first internal address of the first perimeter router as a nexthop of the first modified version of the third route, the first internal address of the first perimeter router being in a domain of the internal network and being different from the first address.

12. The method of claim 11, further comprising:

receiving, by the first internal node, a BGP control packet from the second perimeter router;

(a) determining, by the first internal node, that the second perimeter router has become active and that the first perimeter router is no longer active; and in response to (a), distributing, by the first internal node, a second modified version of the third route, the second modified version of the third route adding a second internal address of the second perimeter router as a nexthop of the second modified version of the third route, the second internal address of the second perimeter router being in the domain of the internal network and being different from the first address and from the first internal address.

13. The method of claim 12, wherein the tunnel is a first tunnel, the method further comprising:

evaluating, by the internal node, a source address of a second tunnel over which the BGP control packet was received;

wherein (a) comprises determining, by the internal node, that the source address of the second tunnel is different from the source address of the first tunnel.

14. The method of claim 10, further comprising:

receiving, by the first internal node, a third route announced by the external node, the first route defining a route from the second internal node to the external node;

distributing, by the first internal node, a first modified version of the third route to the second internal node, the first modified version of the third route adding a first internal address of the first perimeter router as a nexthop of the first modified version of the third route; and distributing, by the first internal node, a second modified version of the third route to the first perimeter router, the second modified version of the third route retaining an external address of the external node as a nexthop of the second modified version of the third route.

15. A method comprising:

providing a first perimeter router at a boundary between an internal network and an external network;

providing an internal node executing within the internal network and connected to the first perimeter router by the internal network;

executing, by the internal node, a Border Gateway Protocol (BGP) executable implementing BGP;

establishing, by the internal node, an external BGP (eBGP) session with an external node with the BGP executable;

routing, by the first perimeter router, control traffic of the eBGP session addressed to a first address assigned to the internal node to the internal node over an internet protocol (IP) tunnel, the first address also being assigned to the first perimeter router;

routing, by the first perimeter router, traffic addressed to the first address that is not control traffic of the eBGP session in bypass of the internal node; and performing failover from the first perimeter router to a second perimeter router while continuing the eBGP session between the internal node and the external node through the second perimeter router without establishing a new eBGP session.

16. The method of claim 15, wherein the second perimeter router is also assigned the first address, the first address being an external address defined in a domain of the external network.

17. The method of claim 16, wherein the first perimeter router is active and the second perimeter router is a standby router for the first perimeter router according to virtual redundant router protocol (VRRP).

18. The method of claim 17, wherein the internal node implements a first internal BGP (iBGP) session with the first perimeter router and a second iBGP session with the second perimeter router.

19. The method of claim 17, wherein the internal node is a first internal node, the method further comprising:

receiving, by the first internal node, over the IP tunnel, a first route announced by the external node, the first route defining a route from a second internal node to the external node;

evaluating, by the first internal node, a source address of the IP tunnel; and distributing, by the first internal node, a first modified version of the first route, the first modified version of the first route adding the source address of the IP tunnel as a nexthop of the first modified version of the first route, the source address of the IP tunnel being in a domain of the internal network and being different from the first address.

20. The method of claim 19, wherein the IP tunnel is a first IP tunnel, the method further comprising:

receiving, by the first internal node, a BGP control packet from the second perimeter router over a second IP tunnel;

evaluating, by the internal node, a source address of the second IP tunnel;

(a) determining, by the internal node, that the source address of the second IP tunnel is different from the source address of the first IP tunnel; and in response to (a), distributing, by the first internal node, a second modified version of the first route, the second modified version of the first route adding a second internal address of the second perimeter router as a nexthop of the second modified version of the first route, the source address of the second IP tunnel being in the domain of the internal network and being different from the first address and from the source address of the first IP tunnel.

\* \* \* \* \*